United States Patent [19]

Nakamura et al.

[11] 4,318,124
[45] Mar. 2, 1982

[54] AUTOMATIC REGISTRATION SYSTEM

[75] Inventors: Takashi Nakamura; Yoshihiro Morioka, both of Tokyo, Japan

[73] Assignee: Sony Corporation, Tokyo, Japan

[21] Appl. No.: 191,683

[22] Filed: Sep. 29, 1980

[30] Foreign Application Priority Data

Sep. 29, 1979 [JP] Japan ................ 54-126154

[51] Int. Cl.$^3$ ............................. H04N 9/09
[52] U.S. Cl. ..................................... 358/51
[58] Field of Search ......................... 358/51

[56] References Cited

U.S. PATENT DOCUMENTS 3,838,310  9/1974  Varian ..................... 358/51

Primary Examiner—John C. Martin
Attorney, Agent, or Firm—Lewis H. Eslinger; Alvin Sinderbrand

[57] ABSTRACT

An automatic registration system for use in a plural pickup tube color television camera comprises an edge detector circuit which provides an edge signal representing the position of an edge of a sharply-edged object; a time difference detector circuit for detecting the difference in time between the scanning of the edge by, for example, a green pickup tube, and that by a red or blue pickup tube, and providing a deflection signal; a multiplier providing the product of the edge signal and the deflection signal as an error signal; a sample hold circuit for providing a misregistration signal, in response to the error signal, having a magnitude and polarity respectively indicative of the degree and direction of misregistration of the pictures of the pickup tubes; and a circuit for correcting misregistration in response to the misregistration signal. The circuit for correcting misregistration can include an up/down counter whose direction of counting is determined by the polarity of the misregistration signal.

11 Claims, 33 Drawing Figures

FIG.5A
FIG.5B
FIG.5C
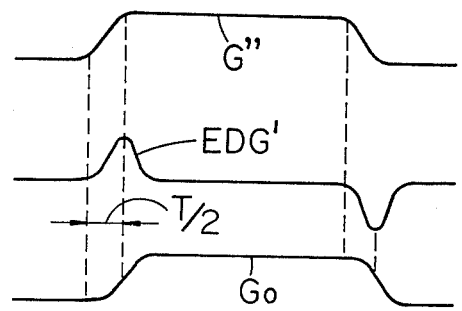
FIG.6
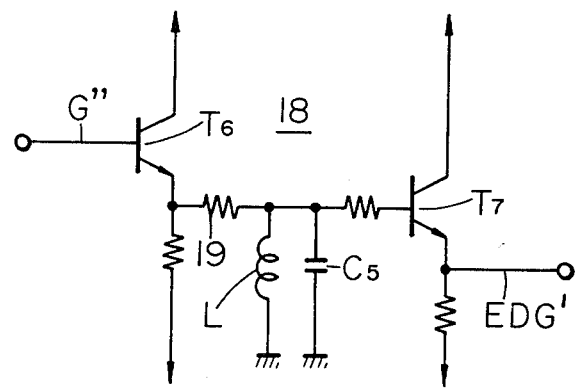

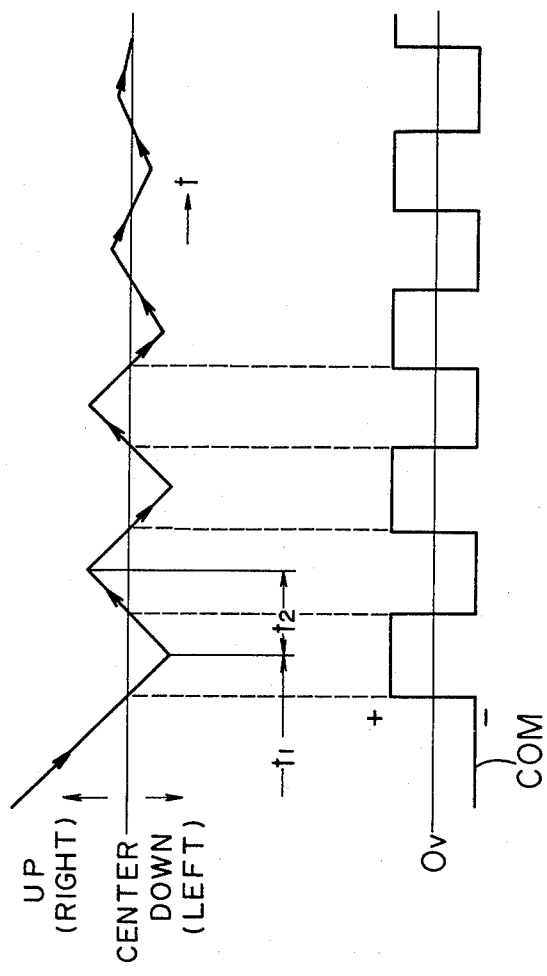

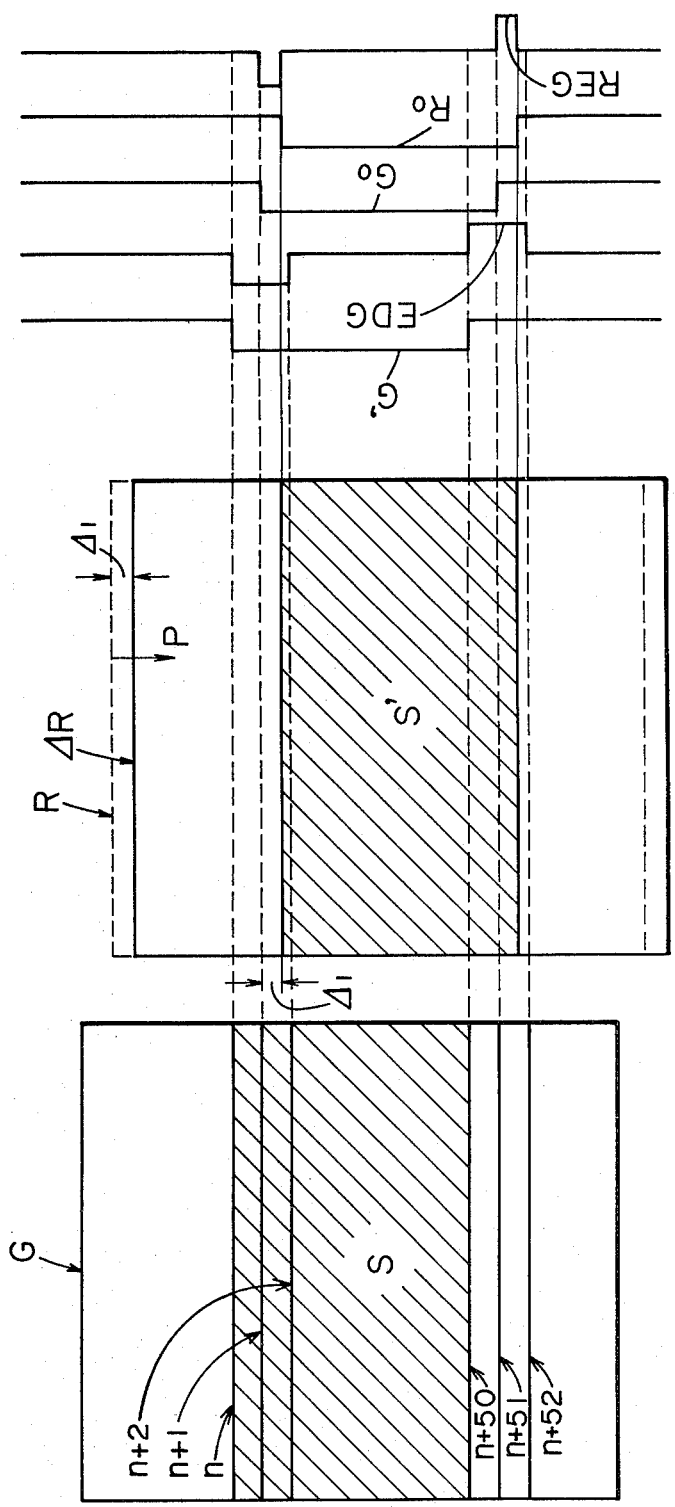

AUTOMATIC REGISTRATION SYSTEM

BACKGROUND OF THE INVENTION

1. Field of the Invention

This invention relates to an automatic registration system for use in a color television camera having plural pickup devices, for example, three pickup tubes for the respective primary colors (Red, Green, and Blue) or two pickup tubes for brightness and chrominance, and more particularly to an automatic registration system in which errors signals with respect to picture centers of the pickup devices are derived, and the picture centers can be accurately adjusted with the error signals.

2. Description of the Prior Art

In a color television camera having plural pickup tubes, when picture centers of the pickup tubes do not coincide with each other, color misregistration occurs. According to a conventional correction method, the picture centers of the pickup tubes are manually adjusted while viewing the composite output picture of the pickup tubes. Such operation is troublesome in that it is difficult and slow. Further, it is difficult to accurately adjust the picture centers of the pickup tubes. A special reference object, such as a test chart, is required for the adjustment. It is often required that the pickup apparatus include within it a reference object to be picked up for the adjustment of registration.

SUMMARY OF THE INVENTION

An object of this invention is to provide an automatic registration system for use in a color television camera which is simple in construction and which can automatically and accurately correct misregistration of several pickup sources.

Another object of this invention is to provide an automatic registration system for use in a color television camera in which no special technique is required for correction of misregistrations in the vertical and horizontal directions (considered with respect to the direction of line scanning).

A further object of this invention is to provide an automatic registration system for use in a color television camera which need not incorporate any special object to be picked up for correction of misregistration.

In accordance with an aspect of this invention, an automatic registration system for use in a plural-pickup-tube color television camera, for correcting misregistration of pictures picked up by at least a first and a second pickup device from an object having at least one distinct edge, in which the pickup devices scan in the vertical and in the horizontal directions and provide respective video output signals, comprises an edge detecting circuit for detecting the scanning of the at least one edge of the object and providing an edge signal in response to such detecting; a time-difference detecting circuit for detecting the time difference between scanning of the edge by the first pickup device and scanning thereof by the second pickup device, and providing a deflection signal representing such time difference; a multiplier providing an error signal corresponding to the product of the edge signal and the deflection signal; a circuit for providing a misregistration signal having a magnitude and a polarity respectively corresponding to the degree and direction of misregistration of the pictures of said first and second pickup devices; and a circuit for correcting misregistration of the picture of said second pickup device relative to the picture of said first pickup device, in response to said misregistration signal.

Various other objects, advantages, and features of the present invention will become readily apparent from the ensuing detailed description, and the novel features will be particularly pointed out in the appended claims.

BRIEF DESCRIPTION OF THE DRAWINGS

FIG. 5A to FIG. 5C are waveforms of signals occurring at points in the block diagram of FIG. 4;

FIG. 6 is a circuit diagram of a differential circuit in the block diagram of FIG. 4;

FIG. 8A and FIG. 8B are waveforms of signals occurring at points in the block diagram of FIG. 7;

FIG. 9A and FIG. 9B are front views of the screens of two pickup tubes; and

FIGS. 10A–10E show waveforms of the signals on the screens of FIG. 9A and FIG. 9B.

DETAILED DESCRIPTION OF THE PREFERRED EMBODIMENTS

Figure 1:
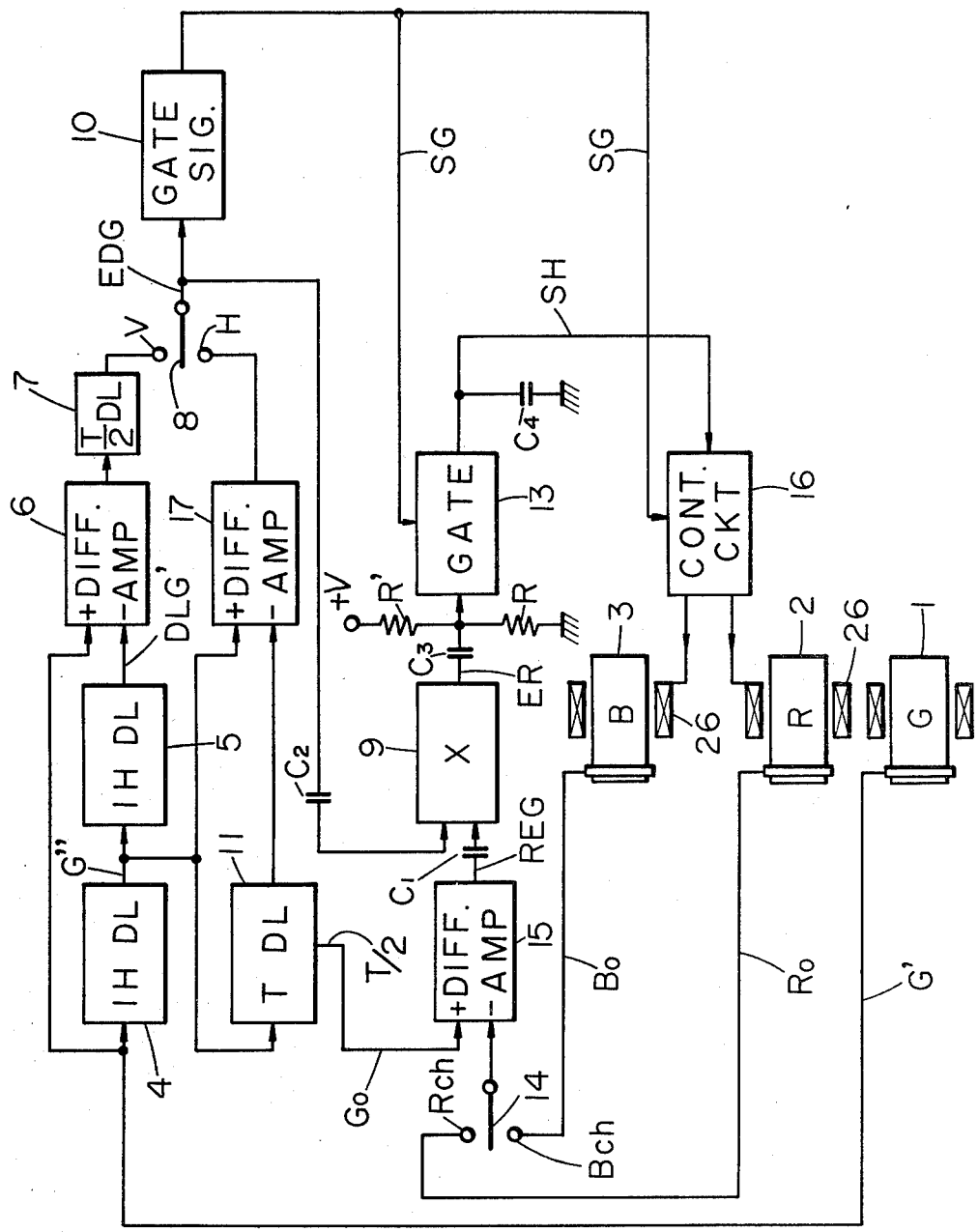
FIG. 1 is a block diagram of an automatic registration system, according to one embodiment of this invention, for use in a color television camera having three pickup tubes.

With reference to the drawings, and initially to FIG. 1 thereof, and to the waveforms of FIGS. 2A to 2P, an automatic registration system for use in a three-pickup-tube color television camera, according to one embodiment of this invention, has a Green pickup tube 1, a Red pickup tube 2, and a Blue pickup tube 3. According to the usual convention, registration is effected with reference to the Green pickup tube 1.

The currents flowing through the vertical and horizontal deflection coils of Green pickup tube 1 are biased so as to be displaced by one scanning line in the vertical direction and by an amount in the horizontal direction corresponding to a deflection time of T/2, where T/2 is small with respect to one scanning period 1H. The video output G′ of Green pickup tube 1 leads the phase of the video outputs Ro, Bo of the other pickup tubes 2, 3. The video output G′ of pickup tube 1 is shown in FIG. 2A to have a high level thereof corresponding to the white portion of the picture.

The time-differential bias of T/2 is introduced to obtain an error signal for correcting horizontal registration, and an explanation thereof is not required for vertical registration. This bias may be continuously imparted to deflection circuits of the Green, Red, and Blue pickup tubes 1, 2, and 3, or it may be imparted to the deflection circuit only during correction of registration.

In a high quality television camera of the type including an aperture compensation system or enhancer, the picked-up image of Green pickup tube 1 is initially deflected, as mentioned above, by one scanning line 1H in the vertical direction and by a small amount in the horizontal direction.

The video output G' of Green pickup tube 1 is coupled to a 1H delay circuit 4 whose 1H-delayed output G" is supplied to another delay circuit 11 having a delay T. The delay time T ($=2\times T/2$) of delay circuit 11, as aforesaid, is short with respect to one horizontal scanning period 1H, for example, about 150 nsec. A center tap T/2 of delay circuit 11 provides video signal $G_O$, as shown in FIG. 2E, having substantially the same phase as the video outputs $R_O$, $B_O$ of the other pickup tubes 2 and 3, and this signal $G_O$ is used as a reference signal (i.e., a so-called main line signal). The delay time of T/2 can be neglected in the illustrated waveforms of FIGS. 2A–2P.

In the portion of the system effective for correction of misregistration in the vertical direction, the 1H delay circuit 4 is coupled through another 1H delay circuit 5 to a differential amplifier 6, so that the latter is supplied at an inverting terminal (−) thereof with a signal DLG' delayed 2H behind the video output G' of the Green pickup tube 1. The latter video output G' is applied to a noninverting terminal (+) of differential amplifier 6, which provides a detail or "edge" signal EDG that is positive for rising values and negative for falling values of video output G'. Edge signal EDG is applied through a T/2 delay circuit 7 to a vertical terminal V of a selector switch 8 so that edge signal EDG is matched in phase, at its aperture at selector switch 8 (FIG. 2C), with the phase of main line signal $G_O$. Switch 8 furnishes edge signal EDG through a coupling capacitor $C_2$, which serves to block the DC component of edge signal EDG, to one input of a multiplier 9 and also furnishes edge signal EDG to a gate signal generator 10. The latter forms a sampling gate signal SG (FIG. 2D) that is aligned in phase with edge signal EDG.

Video pickup tubes 2 and 3 are coupled to respective inputs of another selector switch 14, so that one of the video outputs $R_O$ and $B_O$ thereof is furnished therefrom to an inverting input terminal (−) of a differential amplifier 15. Main line signal $G_O$ is furnished from the center tap of T delay circuit 11 to a noninverting input terminal (+) of differential amplifier 15, so that the latter provides a deflection signal REG (FIG. 2G) which is indicative of the difference in the amount of deflection in the vertical direction (or, as appropriate, in the horizontal direction) between the centers of the reference picture as picked up by Green pickup tube 1 and as picked up by one of the other pickup tubes 2 and 3.

The AC component of deflection signal REG is furnished from differential amplifier 15 through a capacitor $C_1$ to a second input of multiplier 9. The latter furnishes an error signal ER (FIG. 2H) representing the product of edge signal EDG and deflection signal REG through a coupling capacitor $C_3$ to a sample hold circuit including a gate circuit 13 and a sample hold capacitor $C_4$. Biassing resistors R and R' coupled between ground and a source voltage +V supply a reference voltage to gate circuit 13 of the sample hold circuit. Sampling gate signal SG (FIG. 2D) is furnished from gate signal generator 10 to gate circuit 13 so that error signal ER is passed through gate circuit 13 and stored on capacitor $C_4$ as a sample hold voltage SH (FIG. 2I). The magnitude of sample hold voltage SH substantially corresponds to the amount of deflection of the center of the picture (and the amount of misregistration), while the polarity thereof indicates the direction of such deflection (and misregistration). Then, the sample hold voltage SH is furnished to a control circuit 16, which is gated by sampling gate signal SG. Control circuit 16 then adjusts the bias of the current applied to deflection coils 26 of Red and Blue pickup tubes 2 and 3 in order to adjust the deflection and achieve proper registration.

Also included in system of FIG. 1 is a differential amplifier 17 having an inverting input terminal (−) coupled to the output of T delay circuit 11, a noninverting input terminal (+) coupled to receive the 1H delayed output G" from 1H delay circuit 4, and an output coupled to a horizontal terminal H of selector switch 8. Differential amplifier 17 furnishes edge signal EDG during correction of misregistration in the horizontal direction, as described in detail later.

The operation of the system of FIG. 1 can be considered first in the case in which, as shown in FIG. 2F, the video output $R_O$ (or $B_O$) is delayed an amount $\Delta 1$ behind its correct position. In this case, deflection signal REG (FIG. 2G) obtained from differential amplifier 15 will be positive for rising values of video output $R_O$ (or $B_O$) and negative for falling values thereof. Error signal ER, which as aforesaid is the product of edge signal EDG and deflection signal REG, will be positive for both rising and falling values of video output $R_O$ (or $B_O$) as shown in FIG. 2H, and will have a width proportional to the amount of deflection.

In the embodiment of FIG. 1, the output level of multiplier 9 is nearly proportional to the input level of edge signal EDG, and is zero expect during occurrences of edge signal EDG. Thus, the more distinct the edge of the object to be picked up is, the higher the level of edge signal EDG will be. Accordingly, the error signal from the multiplier 9 includes a weighting circuit to automatically adjust the output error signal ER to allow for the distinctness of the edge of the object to be picked up. Thus, edge detecting accuracy is improved.

In this case, the widths of the position deflection signal REG and error signal ER vary with the amount of the deflection. However, even when the position deflection is extremely large, for example, larger than 1H, these signals will not adversely influence the error information signal or sample hold voltage SH, because the error signal ER is gated by the gate signal SG, and is thereby limited in width to the width of gate signal SG. Accordingly, the amplitude of the position deflection signal REG has a great influence on the sample hold voltage SH. For a conventional color television camera, it is required to correct misregistration at a maximum of 10H deflection. It is remembered that the amplitude of the position deflection signal REG depends on the brightness of the object to be picked up, and on the sharpness of the object. However, to effect correct registration, only accurate polarity is required for the final error signal SH and its amplitude becomes unimportant.

The error signal ER is passed through gate circuit 13 for the duration of gate signal SG. Capacitor $C_3$ prevents DC drift in circuits such as multiplier 9 from influencing error signal ER.

The mean voltage of the gated error signal ER for the period of the gate signal SG is held by a capacitor $C_4$ connected to an output terminal of the gate circuit 13. Thus, the sample hold voltage SH as shown in FIG. 2I is obtained from the capacitor $C_4$. The level of the sample hold voltage SH corresponds to the average DC level of error signal ER, and thus also corresponds substantially to the amount of the deflection of the center of the picture, while the polarity of the sample hold voltage SH corresponds to the direction of the deflection of the center of the picture.

Alternatively, the error signal ER from the multiplier 9 may be simply integrated to obtain the DC error signal SH. However, it is preferable to obtain the sample hold voltage by means of gate circuit 13 and capacitor $C_4$ because the integration output of gate circuit 13 and capacitor $C_4$ is higher than for an integrator, and influence of noise or of any unwanted signal thereon is less. Thus, the construction shown in FIG. 1 achieves superior accuracy of error detection.

FIGS. 2J to 2M illustrate the case in which the output $R_O$ (or $B_O$) of the pickup tube 2 (or 3) is in advance, by the time $\Delta 2$ in the vertical direction, of video signal $G_O$, that is, the case in which the center of the picture of the respective pickup tube 2 or 3 deflects in a direction opposite to the direction in the above-described case. In this case, as shown in FIG. 2K, position deflection signal REG is negative for rising values of output $R_O$ (or $B_O$) and is positive for falling values thereof. Correspondingly, error signal ER, as shown in FIG. 2L, obtained by multiplication of position deflection signal REG and edge signal EDG, has a negative value, and is sampled and held to obtain a negative DC error signal SH as shown in FIG. 2M.

FIG. 2N illustrates the case in which the phase of the output $R_O$ or $B_O$ of the pickup tube 2 or 3 coincides with the phase of the reference signal $G_O$, that is, in which the center of the picture of pickup tube 2 or 3 coincides with the center of the picture of the pickup tube 1. This case is ideal and represents perfect registration.

If white balance is not achieved between the pickup tubes 1, 2, and 3, the level of the output $R_O$ or $B_O$ is different from the level of the reference signal $G_O$, and as a result the position deflection signal REG from the differential amplifier 15 does not become zero, as shown in FIG. 2O. However, the polarity of the error signal ER obtained by multiplication of the signal REG and edge signal EDG alternates between the rising and falling of the video signal, as shown in FIG. 2P. The positive portion of error signal ER is cancelled out in capacitor $C_4$ by the negative portion thereof, resulting in, a zero sampling hold voltage SH. Thus, white unbalance between the pickup tubes has no adverse influence on the position error detection.

As mentioned previously, sample hold error signal SH is supplied to control circuit 15 to adjust the bias voltage to the deflection coils 26 of pickup tubes 2 and 3. Thus, the position of the center of the picture of the pickup tube 2 or 3 is changed in the vertical direction. The corresponding error signal is detected by the circuit of FIG. 1. The system of FIG. 1 operates as a control loop so that the error signal becomes zero to obtain proper registration. After the misregistration of one of the pickup tubes 2 and 3 is corrected, the selecting switch 14 is changed over to correct misregistration of the other of the pickup tubes 2 and 3. This can be done manually or automatically.

Next, there will be described correction of misregistration of the respective pickup tubes in the horizontal direction.

The correction of the misregistration in the horizontal direction is brought about in the same fashion as that in the vertical direction. The input to the T delay circuit 11 and the output of the T delay circuit 11 are supplied to the differential amplifier 17 to obtain an edge signal EDG in the horizontal direction of the picture. The edge signal EDG is supplied through contact H of switch 8 to the multiplier 9. The position deflection signal REG and the edge signal EDG are multiplied by each other in multiplier 9 to obtain an error signal representing the amount and direction of the deflection of the picture center. Then, this error signal is sampled to obtain a DC error signal by which adjustment of the picture center of the pickup tube 2 or 3 in the horizontal direction is achieved.

Figure 3:
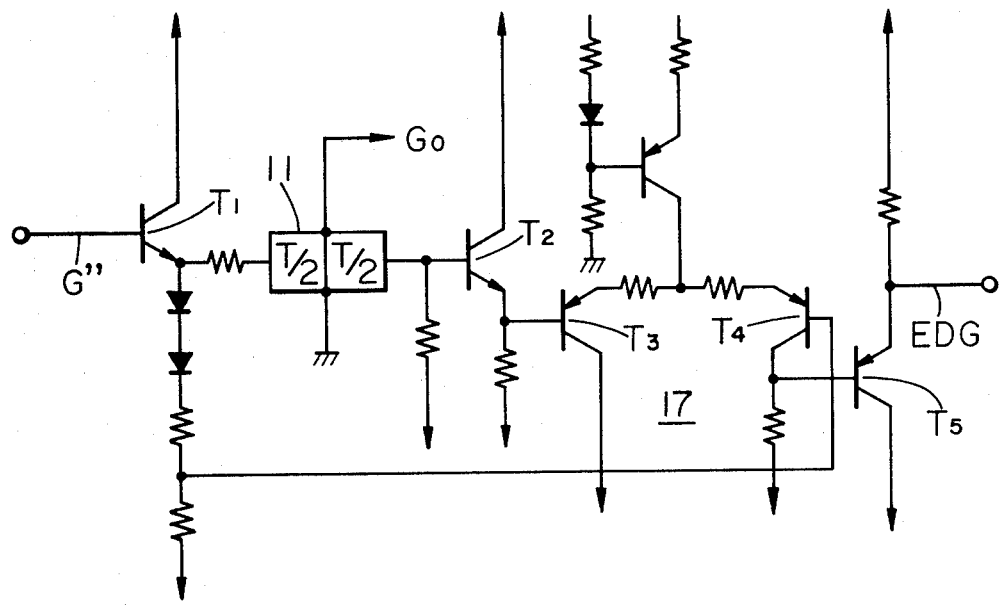
FIG. 3 is a detailed circuit diagram of a horizontal edge detecting circuit shown in the circuit diagram of FIG. 1.

FIG. 3 shows a detailed circuit diagram of one example of the edge detecting circuit of FIG. 1 for detecting horizontal misregistration. The output G" of 1H delay circuit 4 is supplied through a buffer transistor $T_1$ to T delay circuit 11 having delay time of $(T/2 + T/2)$. The T-delayed output of the T delay circuit 11 is supplied through an isolation transistor $T_2$ to the base of one transistor $T_3$ of differential amplifier 17. The signal G" obtained from the emitter circuit of transistor $T_1$ is supplied to the base of another transistor $T_4$ of differential amplifier 17. The emitters of transistors $T_3$ and $T_4$ are resistively coupled together and the collector of transistor $T_4$ is coupled to the base of an output buffer transistor $T_5$. Accordingly, the edge signal EDG is obtained at the emitter of buffer transistor $T_5$. The main line signal $G_O$ is provided from the center tap of T delay circuit 11.

Figure 4:
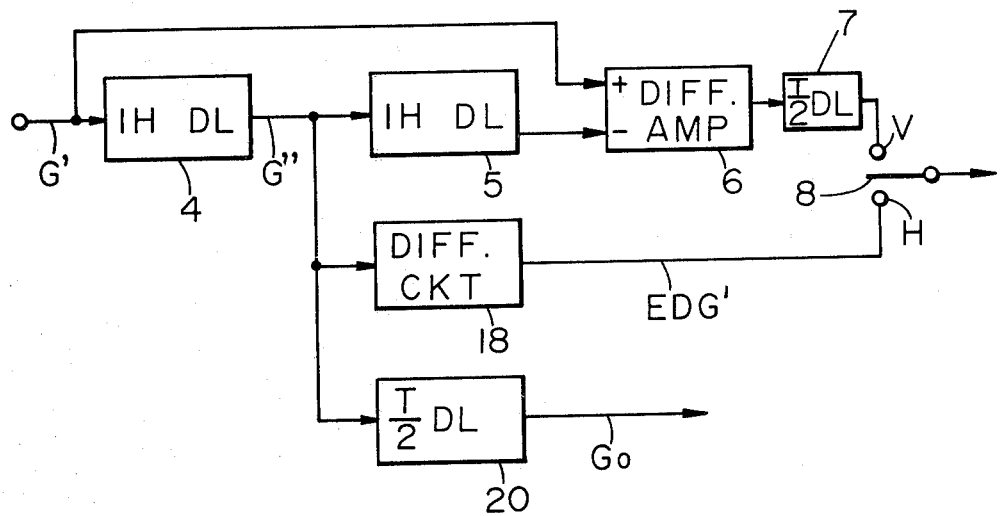
FIG. 4 is a block diagram of a modification of the horizontal edge detecting circuit shown in the circuit diagram of FIG. 1.

FIG. 4 shows one modification of the circuit for detecting the edge of an object in the horizontal direction. Elements depicted in FIG. 1 are identified with the same reference numerals, and a detailed description thereof is omitted. In this detecting circuit, the output G", as shown in FIG. 5A, of 1H delay circuit 5 in the vertical edge detecting circuit, is supplied to a differential circuit 18, which provides an edge signal EDG', as shown in FIG. 5B. Signal G" is further supplied to a T/2 delay circuit 20 to obtain main line signal $G_O$ as a reference signal, as shown in FIG. 5C. The signal G" is delayed substantially to the center of the edge signal EDG'.

As shown in FIG. 6, the differential circuit 18 can be formed of buffer transistors $T_6$ and $T_7$, each arranged as an emitter follower with the base of transistor $T_6$ being an input terminal to receive signal G" and the emitter of transistor $T_7$ being an output terminal to provide edge signal EDG'. A resistor 19 couples the emitter of transistor to $T_6$ to the base of transistor $T_7$, and a tank comprised of a coil L and a capacitor $C_5$ is coupled between the base of transistor $T_7$ and a voltage reference point, such as ground.

Figure 7:
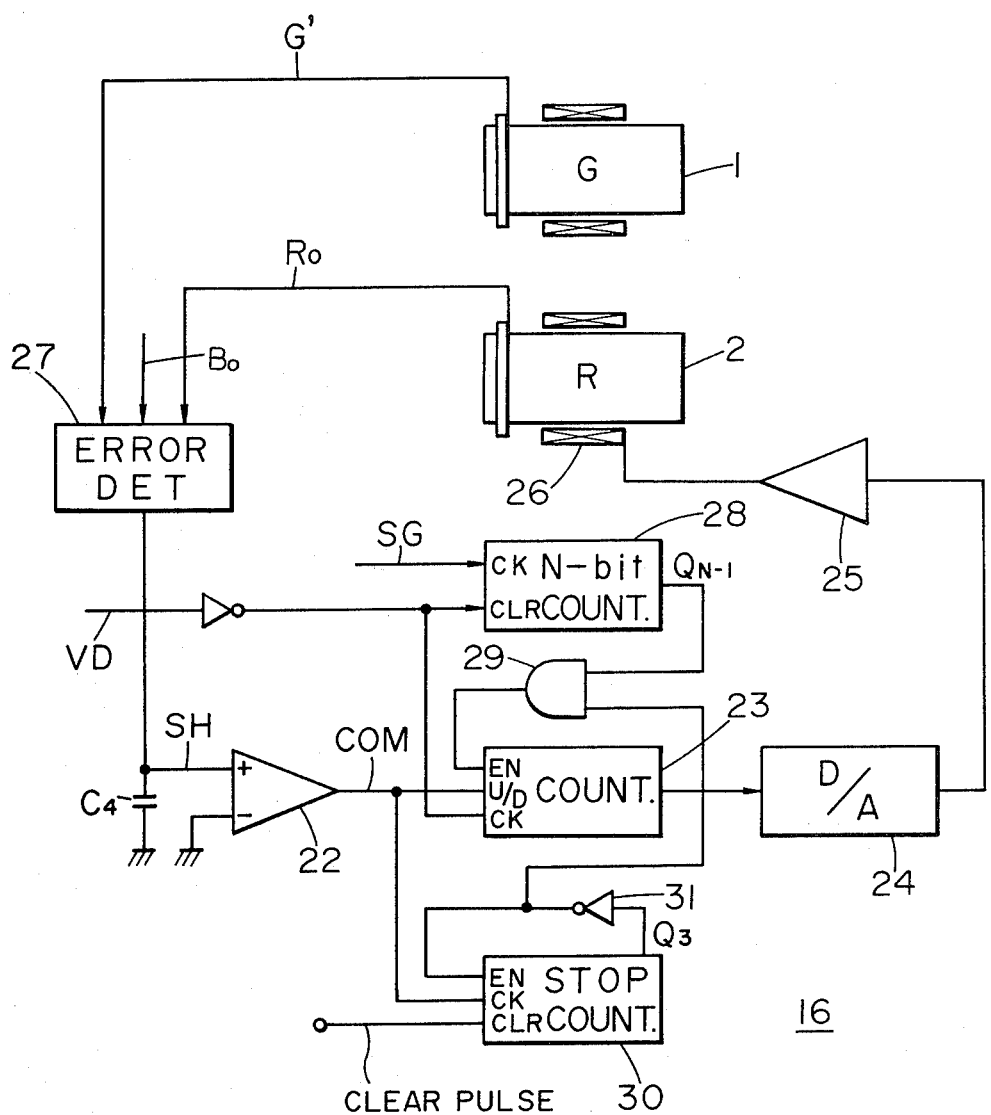
FIG. 7 is a block diagram of a control circuit in the block diagram of FIG. 1.

One example of control circuit 16 is shown in FIG. 7 and includes a comparator 22 and an up/down counter 23, the direction of counting of which is controlled by the output of comparator 22. An output of counter 23 is supplied to a D/A converter 24 to be converted to an analogue voltage which is thence supplied, as a bias voltage, through an amplifier 25 to deflection coil 26 of the pickup tube 2 to be adjusted. The position of the picture center of the pickup tube 2 is changed at a predetermined speed in accordance with the output of counter 23, as shown in FIG. 8A. This speed is determined by clock pulses applied to counter 23, which, in this embodiment, are vertical synchronizing signals VD.

The video output $R_O$ (or $B_O$) of the pickup tube 2 (or 3) is supplied to an error detecting circuit 27, and it is compared with the output G' of the pickup tube 1 to form the error signal SH representing the amount and direction of the deflection of the picture center. Signal SH is compared with ground potential (OV) in comparator 22. When the picture centers of the pickup tubes 1 and 2 coincide with each other, the error signal is zero volts. When the error signal is negative, the output COM of comparator 22 is at low level, as shown in FIG. 8B. Counter 23 is conditioned to count down by the low level output COM of comparator 22, and the bias current flowing through the deflection coil of the pickup tube 2 thereby decreases as the count on of counter 23 decreases. Accordingly, the picture center of pickup tube 2 is moved downwards, for example, in the period of $t_1$ as shown in FIG. 8A.

When the picture center of the pickup tube 2 passes beyond the picture center of the pickup tube 1, the polarity of the error signal from error detector 27 is inverted, and becomes positive. The output COM of comparator 22 goes to a high level, as shown in FIG. 8B, and counter 23 counts up. The bias current of the deflection coil 26 of the pickup tube 2 increases with the increased count on counter 23, and the picture center of the pickup tube 2 is moved upwards, for example, in the period of $t_2$, as shown in FIG. 8A. These operations are repeated.

An N-bit counter 28 is coupled to an enable terminal EN of counter 23 to enable it to count up or down. When the output of counter 28 is at a high level, counter 23 commences counting. The sampling gate pulse SG from gate signal generator 10 shown in FIG. 1 is supplied as a clock pulse to N-bit counter 28, and the vertical synchronizing signal VD is supplied as a clear pulse thereto. Counter 28 is so set that, when the counter 28 counts more than N gate pulses SG within the period of the vertical synchronizing signal VD, the output $Q_{N-1}$ of the counter 28 attains a high level. The output of counter 28 is supplied through an AND gate 29 to the enable terminal EN of the UP/DOWN counter 23, so that the latter is conditioned to count by the output of AND gate 29. When counter 28 counts more than N gate pulses SG within the period of the vertical synchronizing signal VD, it is considered that an accurate error signal is obtained by sufficient sampling data. Thus, the position of the picture center starts to be move toward correct adjustment.

The output of comparator 22 is also supplied to a clock terminal of a stop counter 30, which counts the number of times that the output of the comparator 22 is inverted. Initially a clear pulse is applied to a clear terminal CLR of counter 30 to reset the same. In this example when the number of inversions has reached eight, the output $Q_3$ of stop counter 30 attains high level, and is supplied through an inverter 31 to AND gate 29. The output of the latter, which is applied as an input to the enable terminal EN of UP/DOWN counter 23, attains a low level, and counter 23 ceases to count. It is considered that the picture center of the pickup tube 2 substantially coincides with the picture center of tube 1 when the picture center of pickup tube 2 has intersected the picture center of pickup tube 1 eight times. Thus, the adjusting operation ends.

As shown in FIG. 8A and FIG. 8B, in fact, the picture center of the pickup tube is not moved immediately after the output of comparator 22 is inverted, but is moved a short time after the output of comparator 22 is inverted.

Figure 2:
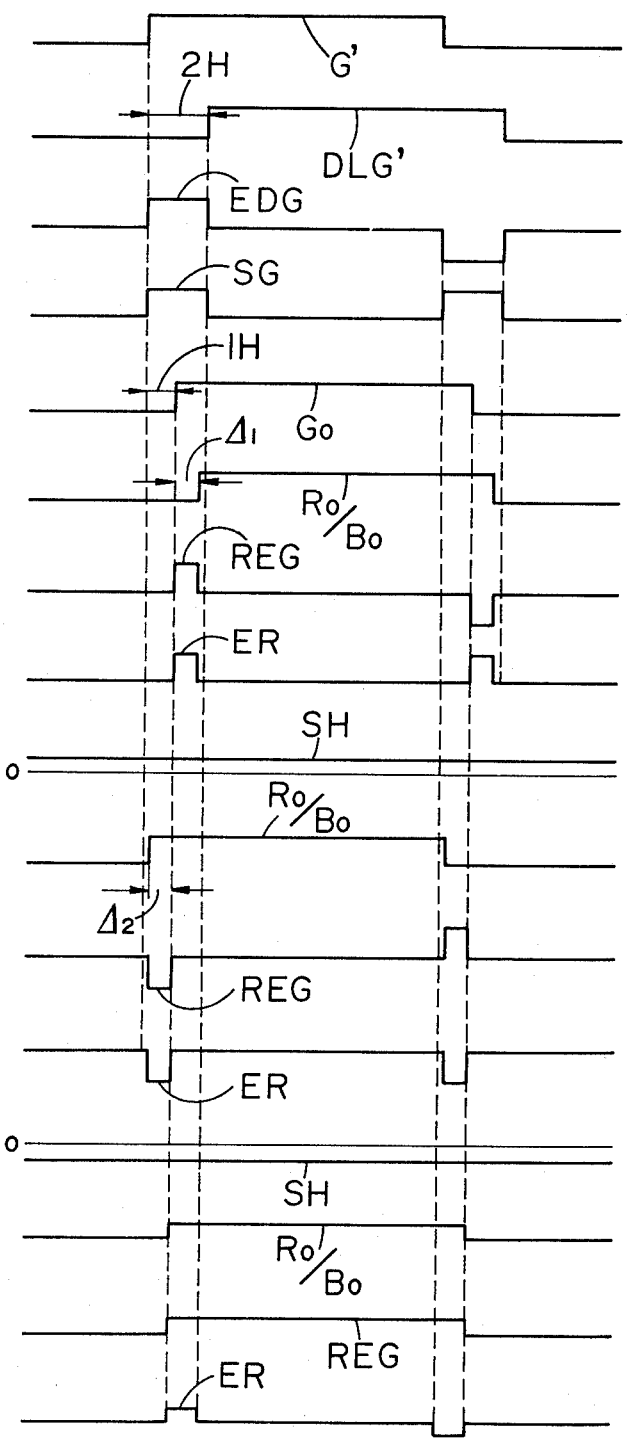
FIG. 2A to FIG. 2P are waveforms of signals occurring at points in the block diagram of FIG. 1.

FIG. 9A, FIG. 9B, and FIGS. 10A to 10E show the relationship between the waveforms of FIG. 2 and the output picture of the pickup tubes 1 and 2. FIG. 9A shows a screen frame of Green tube 1 and several scanning lines thereof. In FIG. 9A, a reference object S (hatched) is picked up in the scanning lines n to n+50. At the same time, object S is picked up, as shown by S' (hatched), by Red pickup tube 2. If there is no misregistration between the picture centers of the pickup tubes 1 and 2, the screen frame of the pickup tube 2 is located at the position shown by R in FIG. 9B, where the picture center of the pickup tube 2 is deflected by one horizontal scanning line 1H from the picture center of the pickup tube 1. In FIG. 9B, a screen frame represented by $\Delta R$ is deflected or misregistered by $\Delta 1$ from the screen frame R in the direction shown by arrow P. The transitions of the signals shown in FIGS. 10A to 10E correspond to the positions of respective lines of FIG. 9A and FIG. 9B.

The error signal may be also be indicated by a meter, in which case, the misregistration can be manually corrected.

In the above-described arrangement according to this invention, the error signal corresponding to the degree of misregistration of the picture centers of the pickup tubes, can be detected with high accuracy. The misregistration can be automatically corrected in response to such error signal. Accordingly, the picture centers can be very accurately adjusted in comparison with the conventional method in which the picture centers are manually adjusted by viewing the output picture. No special reference object is required for picture center adjustment, for any convenient object having a relatively distinct edge can be used for picture center adjustment.

In the above-described embodiment, the DC biases to the deflection currents flowing through the deflection coils of the three pickup tubes are controlled to correct the misregistration. However, this invention may be applied to a television camera using semiconductor elements, such as a Charge Coupled Device (CCD). In that case, the arrangements of the elements are mechanically displaced in response to the error signals.

While this invention is illustrated with one specific embodiment, it will be recognized by those skilled in the art that modifications may be made therein without departing from the true scope of the invention as defined by the following claims.

What is claimed is:

1. Automatic registration apparatus for use in a plural-pickup-device color television camera, for correcting misregistration of pictures picked up by at least a first and second pickup device from an object having at least one distinct edge, in which said pickup devices scan in the vertical and in the horizontal directions and provide respective video output signals, comprising:

means for detecting the scanning of the edge of at least one said object and providing an edge signal in response to such detecting;

means for detecting the time difference between scanning of said at least one edge by said first pickup device and scanning thereof by said second pickup device, and providing a deflection signal representing such time difference;

multiplier means providing an error signal corresponding to the product of said edge signal and said deflection signal;

means for providing a misregistration signal, in response to said error signal, having a magnitude and a polarity respectively corresponding to the degree and direction of misregistration of the pictures of said first and second pickup devices; and means for correcting misregistration of the picture of said second pickup device relative to the picture of said first pickup device, in response to said misregistration signal.

2. Automatic registration apparatus according to claim 1, wherein said means for correcting misregistration includes up/down counter means whose direction of counting is determined by the polarity of said misregistration signal, and providing a correction signal, corresponding to the count attained therein, to correct registration of the pictures of said first and second pickup devices.

3. Automatic registration apparatus according to claim 2, wherein said means for correcting misregistration further includes stop counter means for inhibiting further counting by said up/down counter means when said misregistration signal has changed polarity a predetermined number times.

4. Automatic registration apparatus according to claim 2, wherein said means for correcting misregistration further includes N-bit counter means for enabling said up/down counter means to commence counting when a predetermined number of occurrences of said edge signal are counted in said N-bit counter means during a predetermined period.

5. Automatic registration apparatus according to claim 1, further comprising gate signal generating means providing a gate signal in response to said edge signal, and wherein said means for providing a misregistration signal includes sampling gate means, gated by said gate signal, for sampling said error signal for the duration of said gate signal, and holding means for holding the sampled error signal.

6. Automatic registration apparatus according to claim 1, further comprising AC coupling means, disposed between said multiplier means and said means for providing a misregistration signal, for establishing a predetermined DC level for said error signal thereby to accomodate for any DC drift in said multiplier means.

7. Automatic registration apparatus according to claim 1, wherein said means for detecting the scanning of the at least one edge includes delay means imparting a predetermined delay to the output signal of said first pickup device to yield a delayed output signal, and differential circuit means providing an output representing the difference between said output signal and said delayed output signal as said edge signal.

8. Automatic registration apparatus according to claim 7, wherein said delay means imparts a delay of substantially two horizontal scanning intervals to the output signal of said first pickup device to provide said delayed output signal, and imparts a delay of substantially one horizontal scanning intervals thereto to provide a version of such output signal to be applied to said means for detecting the time difference.

9. Automatic registration apparatus according to claim 1, wherein said means for detecting the scanning of the at least one edge includes differential circuit means for providing said edge signal in response to transitions in level in the output signal of said first pickup device.

10. Automatic registration apparatus according to claim 1, wherein said differential circuit means includes tank circuit means coupled to pass said transitions as said edge signal.

11. Automatic registration apparatus according to claim 1, wherein said pickup devices each have horizontal and vertical deflection means responsive to deflection signals having DC bias levels for controlling the scanning of said pickup devices, and said means for correcting misregistration adjusts the DC bias level of deflection signals applied to at least one of said pickup devices.

* * * * *